(12) United States Patent
McLaurin et al.

(10) Patent No.: US 8,934,856 B2
(45) Date of Patent: Jan. 13, 2015

(54) SYSTEM AND METHOD TO CALIBRATE THE FREQUENCY RESPONSE OF AN ELECTRONIC FILTER

(71) Applicant: Analog Devices, Inc., Norwood, MA (US)

(72) Inventors: David J. McLaurin, Durham, NC (US); Christopher Mayer, Dover, MA (US)

(73) Assignee: Analog Devices, Inc., Norwood, MA (US)

( * ) Notice: Subject to any disclaimer, the term of this patent is extended or adjusted under 35 U.S.C. 154(b) by 12 days.

(21) Appl. No.: 13/650,707

(22) Filed: Oct. 12, 2012

(65) Prior Publication Data

US 2014/0105264 A1   Apr. 17, 2014

(51) Int. Cl.
*H04B 1/04* (2006.01)

(52) U.S. Cl.
USPC ..... 455/120; 455/127.1; 455/126; 455/115.1; 455/115.2; 455/108

(58) Field of Classification Search
CPC ................................ H04B 1/28; H04B 1/1036
USPC ......... 455/120, 127.1, 126, 115.1, 115.2, 108
See application file for complete search history.

(56) References Cited

U.S. PATENT DOCUMENTS

| | | | |
|---|---|---|---|
| 6,429,988 B1 * | 8/2002 | Bhaumik et al. | 360/46 |
| 7,257,505 B1 * | 8/2007 | Kurylak et al. | 702/107 |
| 7,570,710 B1 * | 8/2009 | Fortier et al. | 375/297 |
| 7,932,844 B1 * | 4/2011 | Huynh et al. | 341/120 |
| 8,295,798 B2 * | 10/2012 | Wang et al. | 455/266 |
| 2010/0173598 A1 * | 7/2010 | Kavadias et al. | 455/226.1 |
| 2012/0134401 A1 * | 5/2012 | Rozenblit et al. | 375/224 |
| 2013/0266102 A1 * | 10/2013 | Yan et al. | 375/350 |

* cited by examiner

*Primary Examiner* — Sanh Phu
(74) *Attorney, Agent, or Firm* — Kenyon & Kenyon LLP

(57) ABSTRACT

A system and method provide for calibrating the frequency response of an electronic filter. The system and method include a radio transmitter with both in-phase and quadrature baseband paths. Each baseband path includes a numerically controlled oscillator ("NCO"), a digital signal path, a digital-to-analog converter ("DAC"), and an analog filter. A low frequency tone is applied from the NCO from one of the baseband path, while a high frequency tone is applied from the NCO in the other baseband path. An analog peak detector at output determines which analog filter has the largest amplitude at the output. The peak detector offset between the two analog filters is offset by stimulating the in-phase and quadrature baseband paths with the respective NCOs to find an amplitude difference between the output signals from the NCOs that makes the output of the analog filters the same. Calibration is then performed on the corner frequency and filter peaking through respective stimulation of the in-phase and quadrature baseband paths. The system and method is advantageous as it allows for very accurate calibration of both the filter corner frequency and peaking during a standard transmission operating mode with little additional hardware required.

34 Claims, 3 Drawing Sheets

US 8,934,856 B2

SYSTEM AND METHOD TO CALIBRATE THE FREQUENCY RESPONSE OF AN ELECTRONIC FILTER

FIELD OF THE INVENTION

The present invention relates to electronic filters. The present invention relates to a method for calibrating a frequency response of an electronic filter. The present invention further relates to a method for using in-phase and quadrature baseband paths to tune an electronic filter. The present invention further relates to a method for calibrating a frequency response of an electronic filter using multiple baseband paths during a standard transmission operating mode.

BACKGROUND INFORMATION

Current demands for wireless radio frequency transmitters often require both increased radio frequency bandwidth and lower undesired emissions of the transmitters. Wider transmitter bandwidth requires an increase in the corner frequency of a baseband filter of the radio transmitter. However, increasing the corner frequency of the baseband filter is often problematic, as increasing the corner frequency may subsequently lead to increased undesired emissions from the radio transmitter. This increasingly makes meeting undesired emissions requirements much more difficult.

One method to increase bandwidth without increasing undesired emissions is to place the filter corner frequency inside the transmitter bandwidth and correct any resulting droop using digital equalization. This approach requires a very accurate filter frequency calibration because the filter's frequency transfer function must closely match the expected response inverted by the digital equalizer.

Other implementations have focused generally on the tuning of a filter. Such implementations include making direct measurements of a resistor and capacitor on a semiconductor chip. This method, however, is inexact as it does not capture the impact of the active circuits in the filter, such as op-amps, on the frequency response. Another method for fine tuning of a filter involves reconfiguring the filter as an oscillator and measuring the oscillating frequency. This however, requires modifying the filter from its intended configuration, which often leads to the addition of calibration errors.

Another method for fine tuning a filter is directed towards stimulating a filter with a periodic signal (such as, for example, a square wave) and measuring the time it takes to reach a zero crossing. This method for tuning however, in general, is also restricted towards the calibration of a first order filter response and is ineffective for higher order filters. Another method includes stimulating a filter with a sinusoid wave at the corner phase and using a phase detector to measure when the input and output appear to be 90 degrees out of phase. This method is inefficient, as it fails to calibrate the peaking frequency, and requires additional hardware in its implementation.

Thus there remains a need in the art, for an efficient system and method for calibrating the frequency response of an electronic filter with high accuracy, without the need for additional hardware. There also remains a need in the art for calibrating the frequency response of an electronic filter during a standard transmission operating mode.

SUMMARY OF THE INVENTION

A system and method are described herein that provide for calibrating the frequency response of an electronic filter. The system and method include a radio transmitter with both in-phase and quadrature baseband paths. Each baseband path includes a numerically controlled oscillator ("NCO"), a digital signal path, a digital-to-analog converter ("DAC"), and an analog filter. A low frequency tone is applied from the NCO in either the in-phase baseband path or the quadrature baseband path, while a high frequency tone is applied from the NCO in the other baseband path. An analog peak detector at output determines which analog filter has the largest amplitude at the output. The peak detector offset between the two analog filters is offset by stimulating the in-phase and quadrature baseband paths with the respective NCOs to find an amplitude difference between the output signals from the NCOs that makes the output of the analog filters the same. Calibration is then performed on the corner frequency and filter peaking through respective stimulation of the in-phase and quadrature baseband paths. The system and method is advantageous as it allows for very accurate calibration of both the filter corner frequency and peaking during a standard transmission operating mode with limited additional hardware requirements.

In particular, the exemplary embodiments and/or methods of the present invention are directed to a system and method for calibrating an electronic filter. In an embodiment, the electronic filter may be situated in a radio transmitter. The radio transmitter may include an in-phase baseband path and a quadrature baseband path, with each of the baseband paths having a numerically controlled oscillator, a digital equalization arrangement, a digital-to-analog converter, and an analog filter. The radio transmitter may also include a peak detector circuit that compares magnitudes at the outputs of the baseband paths.

The system and method are further directed towards fine tuning the electronic filter. This method includes calibrating a peak detector offset of the electronic filter, which involves the steps of stimulating the in-phase baseband path and the quadrature baseband path of the radio transmitter with separate low frequency wave signals and determining an amplitude difference between the low frequency wave signals that produce equal magnitudes at the outputs of the baseband paths. Both the low frequency wave signals have equal frequencies and may be less than the corner frequency of the electronic filter.

The method further includes calibrating a corner frequency of the electronic filter. This involves the steps of stimulating the in-phase baseband again with a low frequency wave signal, stimulating a quadrature baseband path of the radio transmitter with a high frequency wave signal, and configuring capacitor settings for the analog filter in the quadrature baseband path to produce equal magnitudes at the outputs of the baseband paths. The analog filter may also apply pre-emphasis to the high frequency signal. Here, the high frequency wave signal may have a frequency equal to the corner frequency of the electronic filter.

The method further includes calibrating a filter peaking of the electronic filter. This involves the steps of stimulating the in-phase baseband path a third time with a low frequency wave signal, stimulating the quadrature baseband path with a medium range frequency wave signal, and configuring the capacitor settings for the analog filter in the quadrature baseband path to produce equal magnitudes at the outputs of the baseband paths under the new conditions. The analog filter may also apply pre-emphasis to the medium range frequency signal. Here, the medium range frequency wave signal has a frequency greater than the low frequency wave signal and less than the corner frequency of the electronic filter.

DETAILED DESCRIPTION

The subject invention will now be described in detail for specific preferred embodiments of the invention, it being understood that these embodiments are intended only as illustrative examples and the invention is not to be limited thereto.

The present invention provides a system and method for calibrating the frequency response of an electronic filter. The system and method include a radio transmitter with in-phase and quadrature baseband paths. Each baseband path includes a numerically controlled oscillator ("NCO"), a digital signal path, a digital-to-analog converter ("DAC"), and an analog filter. A low frequency tone is applied from the NCO in the in-phase baseband path, while a high frequency tone is applied from the NCO in the quadrature baseband path. An analog peak detector at output determines which analog filter has the largest amplitude at the output. The peak detector offset between the two analog filters is offset by stimulating the in-phase and quadrature baseband paths with the respective NCOs to find an amplitude difference between the output signals from the NCOs that makes the output of the analog filters the same. Calibration is then performed on the corner frequency and filter peaking through respective stimulation of the in-phase and quadrature baseband paths. The system and method is advantageous as it allows for very accurate calibration of both the filter corner frequency and peaking during a standard transmission operating mode without additional hardware required.

Figure 1:
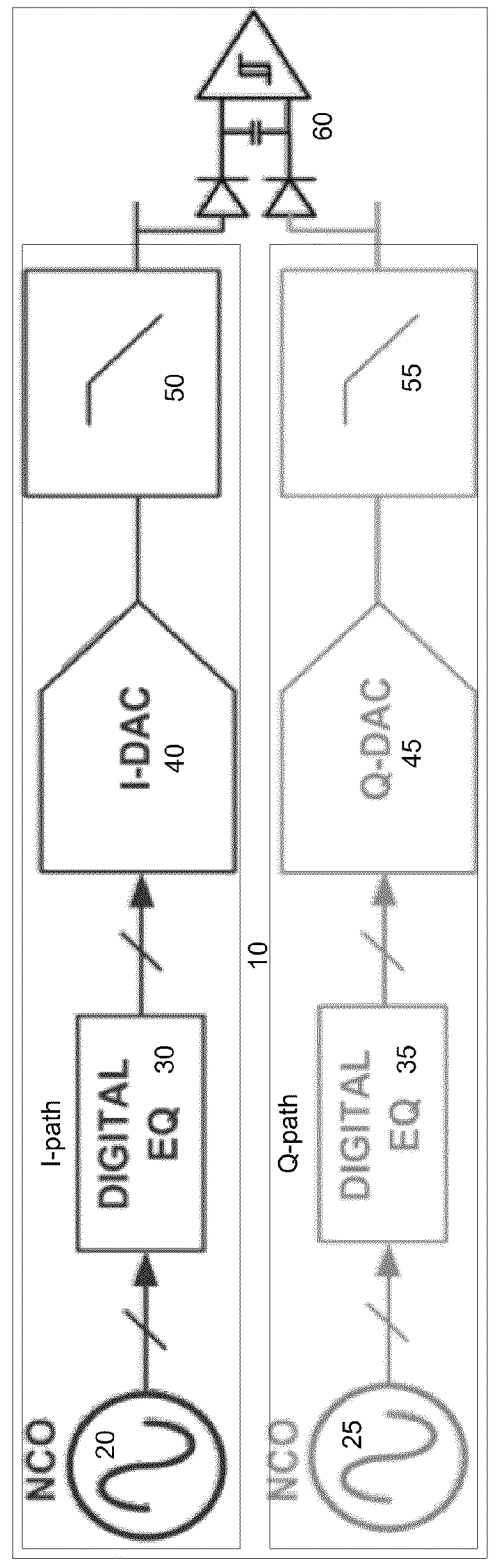
FIG. 1 is a diagram of the baseband portion of a radio transmitter with in-phase and quadrature baseband paths to calibrate an electronic filter according to an embodiment of the present invention.

FIG. 1 illustrates an embodiment of a stage of a radio transmitter 10 with separate in-phase and quadrature baseband paths according to an embodiment of the present invention. Radio transmitter 10 may include an in-phase baseband path ("I-path") and a quadrature baseband path ("Q-path"). The in-phase baseband path may include a numerically controlled oscillator ("NCO") 20. In an embodiment, oscillator 20 may provide a sinusoid or square wave signal to stimulate the in-phase baseband path. In other embodiments, oscillator 20 may provide other waveforms as stimuli for the in-phase baseband path.

The in-phase baseband path may also include a digital equalization block 30 that is connected to oscillator 20. Block 30 may receive the outputted wave stimulus from oscillator 20. Digital equalization block 30 may be configured to equalize out the entire transmit frequency response from NCO 20 providing a flat magnitude response. In an embodiment, digital equalization block 30 may be implemented by one or more finite impulse response ("FIR") filters. In another embodiment, digital equalization block 30 may be implemented by another filter type.

In an example embodiment, digital equalization block 30 may include one or more digital attenuators. The digital attenuators may be configured to reduce the amplitude of the wave stimulus from oscillator 20 without disturbing the waveform itself. In an embodiment, digital equalization block 30 may be implemented with a combination of FIR filters and digital attenuators.

The in-phase baseband path may also include a digital-to-analog converter ("DAC") 40. DAC 40 may be connected to digital equalization block 30. In an embodiment, a sinc function may be set for DAC 40 for the zero-order hold performed by the DAC. DAC 40 may receive the output from digital equalization block 30 and convert the output into an analog signal. The analog signal may be output to analog filter 50.

The in-phase baseband path may also include analog filter 50. In an embodiment, analog filter 50 may be an FIR filter. In other embodiments, analog filter 50 may be another type of filter. In an example embodiment, as illustrated further in the schematic in FIG. 2, analog filter 50 may be a low-pass operational amplifier RC biquad circuit that may include digital programmable capacitors. The output of analog filter 50 may be connected to peak detector 60.

Radio transmitter 10 may also include a quadrature baseband path. The quadrature baseband path may include a numerically controlled oscillator 25. In an embodiment, oscillator 25 may provide a sinusoid or square wave signal to stimulate the in-phase baseband path. In other embodiments, oscillator 25 may provide other waveforms as stimuli for the in-phase baseband path. In an embodiment, oscillator 25 may be identical to oscillator 20 in the in-phase baseband path.

The quadrature baseband path may also include a digital equalization block 35 that is connected to oscillator 25. Block 35 may receive the outputted wave stimulus from oscillator 25. Digital equalization block 35 may be configured to equalize out the entire transmit frequency response from oscillator 25 providing a flat magnitude response. In an embodiment, digital equalization block 35 may be implemented by one or more FIR filters. In another embodiment, digital equalization block 35 may be implemented by another filter type.

Similar to digital equalization block 30 in the in-phase baseband path, in an example embodiment, digital equalization block 35 may include one or more digital attenuators. The digital attenuators may be configured to reduce the amplitude of the wave stimulus from oscillator 25 without disturbing the waveform itself. In an embodiment, digital equalization block 35 may be implemented with a combination of FIR filters and digital attenuators.

The quadrature baseband path may also include a digital-to-analog converter ("DAC") 45. In an embodiment, a sinc function may be set for DAC 45 for the zero-order hold performed by the DAC. DAC 45 may be connected to digital equalization block 35. DAC 45 may receive the output from digital equalization block 35 and convert the output into an analog signal. The analog signal may be output to analog filter 55.

Figure 2:
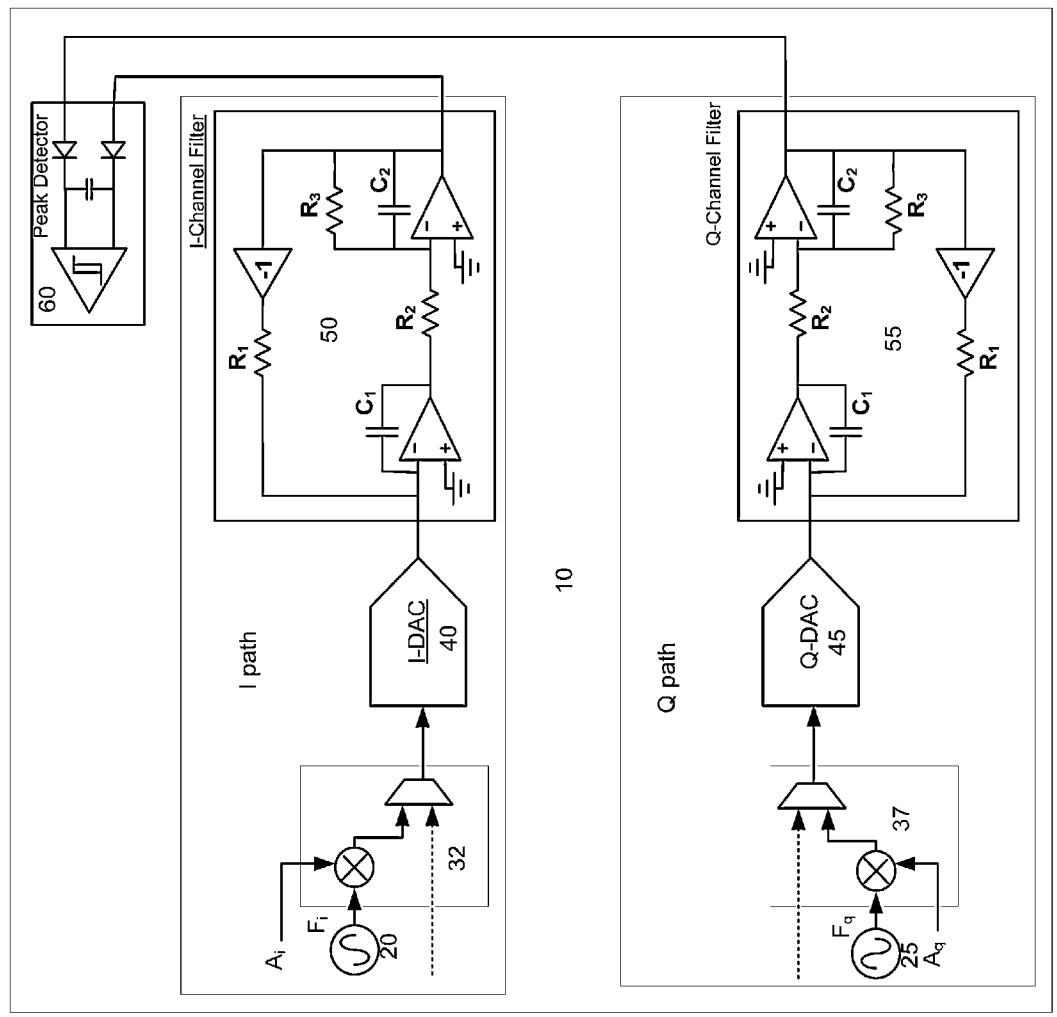
FIG. 2 is a detailed schematic of an example embodiment of a radio transmitter with example implementations of analog filters for calibrating an electronic filter according to an embodiment of the present invention.

The quadrature baseband path may also include analog filter 55. In an embodiment, analog filter 55 may be an FIR filter. In other embodiments, analog filter 55 may be another type of filter. Similar to filter 50, as depicted in FIG. 2, analog filter 55 may also be configured as a low-pass operational amplifier RC biquad circuit that may include digital programmable capacitors. The output of analog filter 55 may also be connected to peak detector 60.

Radio transmitter 10 may also include peak detector 60. Peak detector 60 may be coupled to analog filters 50 and 55. In an embodiment, the filtered outputs of the analog filters may be output to peak detector 60. Peak detector 60 may compare the outputs of analog filter 50 and analog filter 55 to determine which filter has the largest output amplitude. During calibration, the in-phase baseband path and the quadrant baseband path may be stimulating to set the amplitude of the output of analog filter 50 equal to the amplitude of the output of analog filter 55.

FIG. 2 illustrates an example embodiment of a detailed schematic of a stage of a radio transmitter 10 with example implementations of analog filters according to an embodiment of the present invention. Radio transmitter 10 may include an in-phase baseband path and a quadrature baseband path.

The in-phase baseband path may include a numerically controlled oscillator 20 that may provide a sinusoid or square wave signal to stimulate the in-phase baseband path, at a specified frequency, $F_i$. In other embodiments, oscillator 20 may provide other waveforms as stimuli for the in-phase baseband path. The in-phase baseband path may also include digital attenuator 32. Digital attenuator 32 may be coupled to oscillator 20, where attenuator 32 may receive the outputted wave stimulus from oscillator 20. In the example embodiment of FIG. 2, digital attenuator 32 may be implemented to reduce the amplitude of the wave stimulus output from oscillator 20. An attenuation level, $A_i$, may be set for the digital attenuator by a digital equalization block. The attenuated stimulus waveform may be output to DAC 40, which may be coupled to digital attenuator 32. DAC 40 may receive the attenuated output from digital attenuator 32 and convert the output into an analog signal. The analog signal may be output to analog filter 50.

In the example embodiment in FIG. 2, analog filter 50 may be implemented in a RC biquad circuit. The RC biquad filter may advantageously produce bandpass and low-pass responses. It should be understood that the architecture of the RC biquad filter in FIG. 2 is only an example implementation, and the RC biquad filter may be implemented in other manners. In the example embodiment in FIG. 2, the RC biquad filter may be implemented using two operational amplifiers. In other embodiments, the RC biquad filter may be implemented using a single operational amplifier or more than two operational amplifiers. The RC biquad filter may be implemented using an arrangement of resistors and digital programmable capacitors.

In the example embodiment of FIG. 2, analog filter 50 may be implemented as an RC biquad filter with two operational amplifiers. It is should be understood that FIG. 2 represents one possible implementation of analog filter 50. In the embodiment as illustrated in FIG. 2, analog filter 50 may be implemented by a single ended circuit. In other embodiments, analog filter 50 may be implemented with a differential circuit where DAC 40 has both positive and negative outputs.

In the single ended circuit implementation in FIG. 2, a first operational amplifier may be connected at its inverting input to the output of DAC 40 and to one end of a resistor, $R_1$. The non-inverting input of the first operational amplifier may be connected to ground. The inverting input and the output of the first operational amplifier may be connected by a programmable capacitor, $C_1$. The output of the first operational amplifier may also be connected to the inverting input of a second operational amplifier by a resistor, $R_2$.

The non-inverting input of the second operational amplifier may be connected to ground. A programmable capacitor, $C_2$, and a resistor, $R_3$, may be connected in parallel between the inverting input and the output of the second operational amplifier. The output of the second operational amplifier may also be connected via a feedback loop to the inverting input of the first amplifier through a buffer and resistor $R_1$. The output of the second operational amplifier may represent the output of analog filter 50 and therefore it may be connected to peak detector 60.

The radio transmitter 10 depicted in FIG. 2 may also include a quadrature baseband path. The quadrature baseband path may include a numerically controlled oscillator 25 that may provide a sinusoid or square wave signal to stimulate the quadrature baseband path, at a specified frequency, $F_q$. In other embodiments, oscillator 25 may provide other waveforms as stimuli for the quadrature baseband path. The quadrature baseband path may also include a digital attenuator 37. Digital attenuator 37 may be coupled to oscillator 25, where attenuator 37 may receive the outputted wave stimulus from oscillator 25. In the example embodiment of FIG. 2, digital attenuator 37 may be implemented to reduce the amplitude of the wave stimulus output from oscillator 25. An attenuation level, $A_q$, may be set for the digital attenuator by a digital equalization block. The attenuated stimulus waveform may be output to DAC 45, which may be coupled to digital attenuator 37. DAC 45 may receive the attenuated output from attenuator 37 and convert the output into an analog signal. The analog signal may be output to analog filter 55.

In the example embodiment in FIG. 2, similar to analog filter 50, analog filter 55 may also be implemented in a RC biquad circuit. In an embodiment, analog filter 50 and analog filter 55 may be implemented in the same circuit configuration. The RC biquad filter implementation of analog filter 55 may be implemented using an arrangement of resistors and digital programmable capacitors with one or more operational amplifiers. It is should be understood that FIG. 2 represents one possible implementation of analog filter 55. In the embodiment as illustrated in FIG. 2, analog filter 55 may be implemented by a single ended circuit. In other embodiments, analog filter 55 may be implemented with a differential circuit where DAC 45 has both positive and negative outputs.

In the single ended circuit implementation in FIG. 2, analog filter 55 may be implemented as an RC biquad filter with two operational amplifiers. A first operational amplifier may be connected at its inverting input to the output of DAC 45 and to one end of a resistor, $R_1$. The non-inverting input of the first operational amplifier may be connected to ground. The inverting input and the output of the first operational amplifier may be connected by a programmable capacitor, $C_1$. The output of the first operational amplifier may also be connected to the inverting input of a second operational amplifier by a resistor, $R_2$.

The non-inverting input of the second operational amplifier may be connected to ground. A programmable capacitor, $C_2$, and a resistor, $R_3$, may be connected in parallel between the inverting input and the output of the second operational amplifier. The output of the second operational amplifier may also be connected via a feedback loop to the inverting input of the first amplifier through a buffer and resistor $R_1$. The output of the second operational amplifier may represent the output of analog filter 55 and therefore it may also be output to peak detector 60.

During operation, calibration of the electronic filter may occur through the stimulation of the in-phase and quadrature baseband paths. If the amplitudes of the outputs of analog filters 50 and 55 are the same, the electronic filter may be correctly tuned. If the amplitudes of the outputs of the analog filters 50 and 55 are not the same, and peak detector 60 determines an offset between the two amplitudes, the electronic filter is not in tune, and therefore may be calibrated.

In a first step, an offset of the peak detector 60 may be calibrated. Oscillator 20 may output a wave signal, at a specific frequency, $F_i$, on the in-phase baseband path. Conversely, oscillator 25 may output a wave signal at the same frequency on the quadrature baseband path. In an embodiment, the initial signal output by oscillators 20 and 25 may be a low frequency signal. In an example embodiment, the initial signal output by oscillators 20 and 25 may be equal to ⅛th the corner frequency of the transmitter 10. Digital equalization blocks 30 and 35 may attenuate the applied low frequency tones based on determined attenuation levels set for the digital equalization blocks.

While the wave stimuli generated by oscillators 20 and 25 may have the same frequency, the amplitudes of the wave stimuli may be varied. In an embodiment where the amplitude of the wave stimulus output by oscillator 20 and the amplitude of the wave stimulus output by oscillator 25 may be the same, the amplitudes of the outputs of analog filters 50 and 55 may be different. The amplitude of the wave stimulus output by oscillator 20 and the amplitude of the wave stimulus output by oscillator 25 may be varied until the amplitudes of the outputs of analog filters 50 and 55 are the same, and the outputs are equal in magnitude. The system may determine the amplitude difference between the wave stimulus from oscillator 20 and the wave stimulus from oscillator 25 that may achieve this result.

In a subsequent step, the corner frequency may be calibrated. In an embodiment, the filter rolloff at the corner frequency may be, for example, −3 dB. In this step, oscillator 20 may output a wave stimulus at a low frequency on the in-phase baseband path. In an embodiment, this low frequency may be equal to ⅛th the corner frequency. Conversely, oscillator 25 may output a wave stimulus at a higher frequency on the quadrature baseband path. In an embodiment, this higher frequency may be the corner frequency.

The digital attenuator and/or digital equalization filter may be configured to perform pre-emphasis on the high frequency wave stimulus output by oscillator 25. The magnitude of the pre-emphasis may be equal to the expected difference in filter gain at the frequencies of the low and high frequency stimulus. In an embodiment where analog filter 55 may be implemented with programmable capacitors, such as a RC quad filter embodied in FIG. 2, these capacitor settings may be adjusted. A determination may be made of the capacitor settings in analog filter 55 that may set the amplitude of the output of analog filter 55 equal to the amplitude of the output of analog filter 50.

In a further step, the filter peaking may be calibrated. In this step, oscillator 20 may output a wave stimulus at a low frequency on the in-phase baseband path. In an embodiment, this low frequency may be equal to ⅛th the corner frequency. Conversely, oscillator 25 may output a wave stimulus at a medium range frequency on the quadrature baseband path. This medium range frequency may be higher than the low frequency but less than the corner frequency. In an embodiment, this medium range frequency may be equal to ¾th corner frequency.

Analog filter 55 may be configured to perform pre-emphasis on the medium range frequency wave stimulus output by oscillator 25. Analog filter 55 may be configured to further increase the frequency of the medium range frequency wave stimulus. Attenuation of the medium range frequency wave stimulus may also be performed by the DAC sinc function of DAC 45.

In an embodiment where analog filter 55 may be implemented with programmable capacitors, such as a RC quad filter embodied in FIG. 2, these capacitor settings may be adjusted. A determination may be made of the capacitor settings in analog filter 55 that may set the amplitude of the output of analog filter 55 equal to the amplitude of the output of analog filter 50 based on the output stimuli.

Figure 3C:
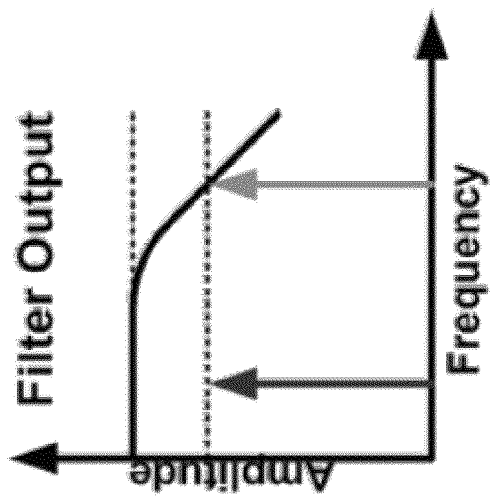
FIGS. 3(a)-(c) are response output graphs at the various stages of the radio transmitter for the in-phase and quadrature baseband paths according to an embodiment of the present invention.
Figure 3B:
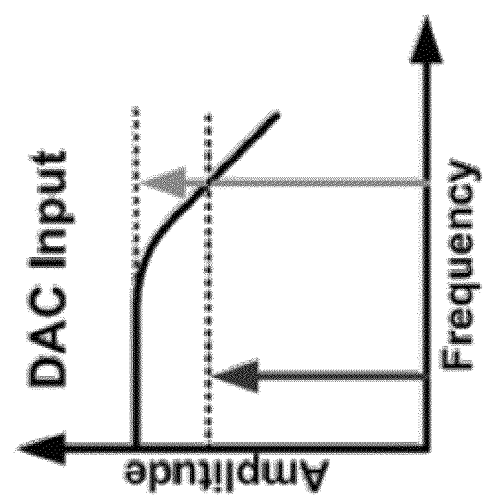
Figure 3A:
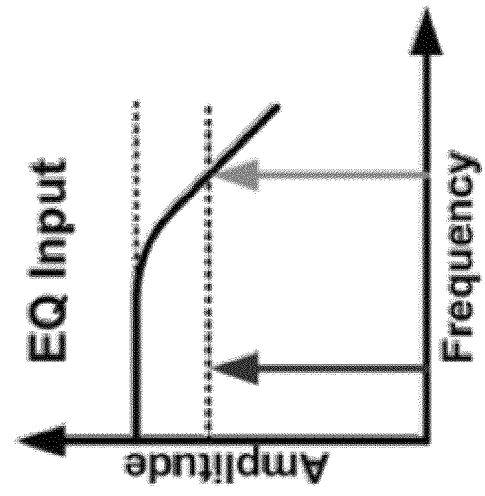

FIGS. 3(a)-(c) illustrate response output graphs at the various stages of the radio transmitter for the in-phase and quadrature baseband paths according to an embodiment of the present invention. The output of the in-phase baseband path may be plotted against the output of the quadrature baseband path, in relation to a frequency transfer function of the electronic filter. The outputs may be plotted in relation to the frequency and amplitude of the output signals.

FIG. 3(a) illustrates the outputs of the in-phase and quadrature baseband paths before the equalization stage of digital equalization blocks 30 and 35. As expected, the quadrature baseband path output signal is at a higher frequency, since $F_q$ is set higher than $F_i$. The amplitudes of the two output signals are also equal in magnitude since the outputs are sampled before digital equalization is performed.

FIG. 3(b) illustrates the outputs of the in-phase and quadrature baseband paths after the equalization stage of digital equalization blocks 30 and 35 and at the inputs of DACs 40 and 45. As expected, the quadrature baseband path output signal is at a higher frequency, since $F_q$ is set higher than $F_i$. The amplitudes of the two output signals are no longer equal in magnitude since different attenuation of the wave stimulus was performed by blocks 30 and 35.

FIG. 3(c) illustrates the outputs of the in-phase and quadrature baseband paths at the outputs of analog filters 50 and 55. As expected, the quadrature baseband path output signal is at a higher frequency, since $F_q$ is set higher than $F_i$. The amplitudes of the two output signals are also equal in magnitude in accordance with the capacitor settings of analog filter 55.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A method for tuning a circuit system having a pair of filters of common architecture, the method comprising:
   calibrating a peak detector offset of the circuit system;
   calibrating a corner frequency of the circuit system, comprising:
      stimulating a first filter with an input signal at a first frequency, lower than an expected cutoff frequency of the filters,
      stimulating the second filter with an input signal at a second frequency proximate to the expected cutoff frequency,
      comparing outputs from the filters, and
      based on the comparison of filter outputs, altering a set of impedance elements within the filters until the filter outputs match each other; and
   calibrating a filter peaking of the circuit system.

2. The method according to claim 1, wherein calibration of the peak detector offset is further comprised by:
   stimulating an in-phase baseband path and a quadrature baseband path of a radio transmitter with input signals having separate frequencies; and
   determining an amplitude difference between the low frequency wave signals that produce equal magnitudes at the outputs of the baseband paths.

3. The method according to claim 1, wherein calibration of the filter peaking is further comprised by:
   stimulating one of the filters with an input signal at a third frequency, lower than the expected cutoff frequency,
   stimulating the other one of the filters with an input signal at another frequency that is intermediate between the third frequency and the expected cutoff frequency, comparing outputs from the filters, and
based on the second comparison of filter outputs, altering another set of impedance elements within the filters until the filter outputs match each other.

4. The method according to claim 2, wherein the first and third frequencies are equal.

5. The method according to claim 1, further comprising:
applying pre-emphasis to the input signal at the second frequency by a digital attenuator.

6. The method according to claim 3, further comprising:
applying pre-emphasis to the input signal having the frequency that is intermediate between the third frequency and the expected cutoff frequency by a digital attenuator.

7. A method for calibrating an electronic filter, the method comprising:
stimulating an in-phase baseband path and a quadrature baseband path of a radio transmitter with separate low frequency wave signals to calibrate a peak detector offset;
determining an amplitude difference between the low frequency wave signals that produce equal magnitudes at the outputs of the baseband paths;
stimulating the quadrature baseband path with a high frequency wave signal;
configuring capacitor settings for an analog filter in the quadrature baseband path to produce equal magnitudes at the outputs of the baseband paths when the quadrature baseband path is stimulated with the high frequency wave signal;
stimulating the quadrature baseband path with a medium range frequency wave signal; and
configuring the capacitor settings for the analog filter in the quadrature baseband path to produce equal magnitudes at the outputs of the baseband paths when the quadrature baseband path is stimulated with the medium range frequency wave signal.

8. The method according to claim 7, further comprising:
restimulating the in-phase baseband path with one of the low frequency wave signals when the quadrature baseband path is stimulated with the high frequency wave signal.

9. The method according to claim 7, further comprising:
restimulating the in-phase baseband path with one of the low frequency wave signals when the quadrature baseband path is stimulated with the medium range frequency wave signal.

10. The method according to claim 7, wherein the low frequency wave signals have equal frequencies.

11. The method according to claim 10, wherein each frequency of the low frequency wave signals is less than a corner frequency of the electronic filter.

12. The method according to claim 7, wherein the high frequency wave signal has a frequency equal to a corner frequency of the electronic filter.

13. The method according to claim 7, wherein the medium range frequency wave signal has a frequency greater than one of the low frequency wave signals and less than a corner frequency of the electronic filter.

14. The method according to claim 7, wherein configuring the capacitor settings for the analog filter in the quadrature baseband path when the quadrature baseband path is stimulated with the high frequency wave signal calibrates a corner frequency of the electronic filter.

15. The method according to claim 7, wherein configuring the capacitor settings for the analog filter in the quadrature baseband path when the quadrature baseband path is stimulated with the medium frequency wave signal calibrates a filter peaking of the electronic filter.

16. The method according to claim 7, further comprising:
applying pre-emphasis to the high frequency wave signal by a digital attenuator.

17. The method according to claim 7, further comprising:
applying pre-emphasis to the medium range frequency wave signal by a digital attenuator.

18. A system for calibrating an electronic filter, the system comprising:
a radio transmitter having an in-phase baseband path and a quadrature baseband path, wherein each of the baseband paths has a numerically controlled oscillator, a digital equalization arrangement, a digital-to-analog converter, and an analog filter; and
a peak detector circuit comparing magnitudes at the outputs of the baseband paths, the peak detector circuit being situated in the radio transmitter;
wherein the numerically controlled oscillators of the two paths generate input signals at different frequencies from each other and, if the magnitudes of the outputs of the baseband paths are equal, the electronic filter is tuned.

19. The system according to claim 18, wherein the numerically controlled oscillators stimulate the baseband paths by generating varying frequency input signals.

20. The system according to claim 19, wherein if both the numerically controlled oscillators generate low frequency input signals, an amplitude difference is determined between the low frequency wave signals that produce equal magnitudes at the outputs of the baseband paths.

21. A method of tuning a circuit system having a pair of filters of common architecture, comprising:
stimulating a first filter at a first time with an input signal at a first frequency, lower than an expected cutoff frequency of the filters, to generate a first filter output,
stimulating a second filter at the first time with an input signal at a second frequency proximate to the expected cutoff frequency to generate a second filter output,
comparing the first filter output with the second filter output, and
based on the comparison of filter outputs, altering a set of impedance elements within the filters until the filter outputs match each other.

22. The method of claim 21, further comprising, thereafter:
stimulating one of the filters with an input signal at a third frequency, lower than the expected cutoff frequency,
stimulating the other one of the filters with an input signal at another frequency that is intermediate between the third frequency and the expected cutoff frequency,
comparing outputs from the filters, and
based on the second comparison of filter outputs, altering another set of impedance elements within the filters until the filter outputs match each other.

23. The method of claim 21, wherein the impedance elements include capacitors and resistors.

24. The method of claim 21, wherein the filters each include at least one operational amplifier.

25. The method of claim 21, wherein the filters each are RC quad filters.

26. The method of claim 21, wherein the filters each are RC biquad filters.

27. The method of claim 21, wherein:
the circuit system is a radio transmitter system,
one of the filters is a member of an in-phase baseband circuit sub-system, and the other one of the filters is a member of a quadrature-phase baseband circuit sub-system.

28. The method of claim 1, wherein the impedance elements include capacitors and resistors.

29. The method of claim 1, wherein the filters each include at least one operational amplifier.

30. The method of claim 1, wherein the filters each are RC quad filters.

31. The method of claim 1, wherein the filters each are RC biquad filters.

32. The method of claim 1, wherein:
the circuit system is a radio transmitter system,
one of the filters is a member of an in-phase baseband circuit sub-system, and
the other one of the filters is a member of a quadrature-phase baseband circuit sub-system.

33. A method of tuning a circuit system having a pair of filters of common architecture, comprising:
stimulating a first filter at a first time with an input signal at a first frequency, lower than an expected cutoff frequency of the filters, to generate a first filter output,
stimulating a second filter at the first time with an input signal at a second frequency that is intermediate between the first frequency and the expected cutoff frequency to generate a second filter output,
comparing the first filter output with the second filter output, and
based on the comparison of filter outputs, altering a set of impedance elements within the filters until the filter outputs match each other.

34. A method for calibrating an electronic filter, the method comprising:
stimulating an in-phase baseband path and a quadrature baseband path of a radio transmitter with separate low frequency wave signals to calibrate a peak detector offset;
determining an amplitude difference between the low frequency wave signals that produce equal magnitudes at the outputs of the baseband paths;
stimulating a selected baseband path with a high frequency wave signal;
configuring capacitor settings for an analog filter in at least one of the baseband paths to produce equal magnitudes at the outputs of the baseband paths when the selected baseband path is stimulated with the high frequency wave signal;
stimulating the selected baseband path with a medium range frequency wave signal; and
configuring the capacitor settings for the analog filter in at least one of the baseband paths to produce equal magnitudes at the outputs of the baseband paths when the selected baseband path is stimulated with the medium range frequency wave signal.

* * * * *